(12) United States Patent
Katoh et al.

(10) Patent No.: US 7,018,456 B2
(45) Date of Patent: Mar. 28, 2006

(54) PHTHALOCYANINE COMPOUND, WATER-BASE INK COMPOSITION AND COLORED MATERIAL

(75) Inventors: Yoshinori Katoh, Saitama (JP); Isao Yamaguchi, Chiba (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/506,449

(22) PCT Filed: Mar. 5, 2003

(86) PCT No.: PCT/JP03/02559

§ 371 (c)(1),
(2), (4) Date: Sep. 1, 2004

(87) PCT Pub. No.: WO03/074613

PCT Pub. Date: Sep. 12, 2003

(65) Prior Publication Data

US 2005/0120910 A1    Jun. 9, 2005

(30) Foreign Application Priority Data

Mar. 7, 2002    (JP) .............................. 2002-062281

(51) Int. Cl.
*C09D 11/02*    (2006.01)
*C09B 47/04*    (2006.01)

(52) U.S. Cl. ............................... 106/31.49; 106/31.78; 540/129; 540/130

(58) Field of Classification Search ............. 106/31.49, 106/31.78; 540/129, 130; 347/100
See application file for complete search history.

(56) References Cited

U.S. PATENT DOCUMENTS

| 2,266,404 | A | * | 12/1941 | Bienert et al. | ............... 540/130 |
| 5,759,254 | A | * | 6/1998 | Macpherson et al. | ....... 106/410 |
| 6,124,451 | A | * | 9/2000 | Healy et al. | ................. 540/140 |
| 6,221,137 | B1 | * | 4/2001 | King et al. | ............... 106/31.29 |
| 6,589,325 | B1 | * | 7/2003 | Katoh et al. | ............. 106/31.49 |

FOREIGN PATENT DOCUMENTS

| EP | 1 174 432 | 1/2002 |
| JP | 2002-006558 | 1/2002 |
| WO | 00/64901 | 11/2000 |

OTHER PUBLICATIONS

Copy of the International Search Report dated May 27, 2003.

* cited by examiner

*Primary Examiner*—Helene Klemanski
(74) *Attorney, Agent, or Firm*—Nields & Lemack

(57) ABSTRACT

A metal phthalocyanine compound that is useful as a black colorant suitable for use in an ink-jet recording ink, a water-based ink composition containing the metal phthalocyanine compound, and a product colored with the metal phthalocyanine compound. In particular, a metal phthalocyanine compound having, as substituents, both an acylamino group and a carboxyethylamino group on the phthalocyanine structure, or the salt thereof is used as a black colorant. Recorded images formed by the use of this colorant are excellent in light fastness and water fastness and exhibit absorption in infrared and visible regions, so that highly effective utilization can be found in printing of, for example, bar codes which are available in near-infrared ray reading.

25 Claims, 1 Drawing Sheet

PHTHALOCYANINE COMPOUND, WATER-BASE INK COMPOSITION AND COLORED MATERIAL

TECHNICAL FIELD

The present invention relates to a novel phthalocyanine compound or the salt thereof useful as a black colorant, a water-based ink composition containing the same compound or the salt thereof, and a colored product using the same composition.

BACKGROUND OF THE INVENTION

The method for recording by means of an ink-jet printer, a representative method among various color recordings, comprises generating ink droplets and depositing onto various recording materials (such as paper, film, cloth) for recording. The method has rapidly been spread in recent years and will be propagated in future because the said ink-jet printer is noiseless as its recording head does not touch a recording material, moreover, the said ink-jet printer can be easily downsized, works in a high-speed and gives easy color printing. The water-based ink dissolving a water-soluble dye in a water-based medium has been used as the ink for a fountain pen or a felt pen and ink-jet recording, wherein a water-soluble organic solvent is generally added for the medium so as to prevent ink from clogging at the pen nib or the ink-jet nozzle. The water-based ink is required to provide a satisfactory density of image, not to clog at the pen nib or the ink-jet nozzle, to dry quickly on the recording material, not to blur, and to have good storage stability. The provided image is also required to have satisfactory light fastness and water fastness. Black ink is the most important among various hues of inks prepared by various dyes because it is used for both a mono-colored image and a full-colored image. The dyes for the black ink have been disclosed by many applications (such as JP Laid-Open No. 144067/1980, JP Laid-Open No. 207660/1982, JP Laid-Open No. 147470/1983, JP Laid-Open No. 93766/1984, JP Laid-Open No. 190269/1987, JP Laid-Open No. 246975/1987, JP Laid-Open No. 22867/1988, JP Laid-Open No. 33484/1988, JP Laid-Open No. 93389/1989, JP Laid-Open No. 140270/1990, JP Laid-Open No. 167270/1991, JP Laid-Open No. 200852/1991, JP Laid-Open No. 359065/1992, JP Laid-Open No. 172668/1994, JP Laid-Open No. 248212/1994, JP Laid-Open No. 26160/1995, JP Laid-Open No. 268256/1995, JP Laid-Open No. 11076/2001, and JP Laid-Open No. 275383/2002). But there has not yet been provided any black ink to meet satisfactorily the above requirements in the market.

An ink-jet printer is widely used from a small OA printer to a big industrial printer. Therefore, better fastness such as the light fastness and the like in the inks for the said ink-jet printer are strongly required. However, there has not yet been provided any black ink to meet the requirements in spite of its highest demand. As for water fastness, it has been remarkably improved on the paper with the surface coated with inorganic fine particles, such as porous silica, alumina sol or a special ceramics, which can absorb the dye from ink, together with a cationic polymer or a PVA resin. However there are still many problems in light fastness and discoloration due to effects of ozone in air or the like on converted paper, so the better light fastness and the improvement of discoloration on various types of coated paper for the ink-jet printer are strongly required.

An azo type such as a diazo body, a triazo body or a tetrazo body is typical as a skeletal the chemical structure of a black colorant used in a water-based ink for ink-jet recording. But an azo type, though it has a relatively good water fastness, is inferior in light fastness compared to the cyan dye represented by a copper phthalocyanine. So, a water-based black ink is commonly obtained by combining several excellent performance colorants. However light fastness has not yet met the demand satisfactorily.

Therefore it is required to develop a black colorant having an excellent water fastness and light fastness, and suitable for inks for ink-jet recording in the absence of any other colorants. To meet the above requirements, a black phthalocyanine colorant obtained by carboxyethylation of aminophthalocyanine is disclosed by JP Laid-Open No. 11076/2001. The said colorant independently has a black hue and an excellent water fastness. However, once the rate of carboxyethylation is raised to improve the aqueous solubility, the said colorant becomes black slightly tinged with red, judging by the naked eye. So it is required to develop a black colorant having high aqueous solubility and also having a black hue no-tinged with red, preferably a black hue tined with blue.

DISCLOSURE OF THE INVENTION

The present inventors made a diligent study to develop a black colorant that, even if used independently, has a blue-tinged black hue suitable for ink-jet recording and light fastness and color fastness of a recorded image nearby to those of a pigment ink and can be readable by near-infrared ray in a printed bar code, and as a result, have completed the present invention. That is, a colorant obtained only by carboxyethylating aminophthalocyanines as mentioned in JP Laid-Open No. 11076/2001 has red-tinged black hue, and the red-tinged black hue became only black hue more tinged with red when the rate of carboxyethylation was raised to improve the aqueous solubility, so a blue-tinged black hue could not be obtained. On the other hand, the present inventors have surprisingly found that a black colorant obtained by reacting aminophthalocyanines with both a carboxyethylating agent and an acylating agent has an excellent light fastness and a good aqueous solubility, and also has a no-red tinged black hue or a blue-tinged black hue. Thus the present invention has been achieved.

Namely, the present invention is relating to as follows:

1. A metal phthalocyanine compound or the salt thereof having both acylamino group(s) and carboxyethylamino group(s) as substituents on the phthalocyanine structure.

2. The phthalocyanine compound or the salt thereof according to item 1 represented by Formula (1) as shown below:

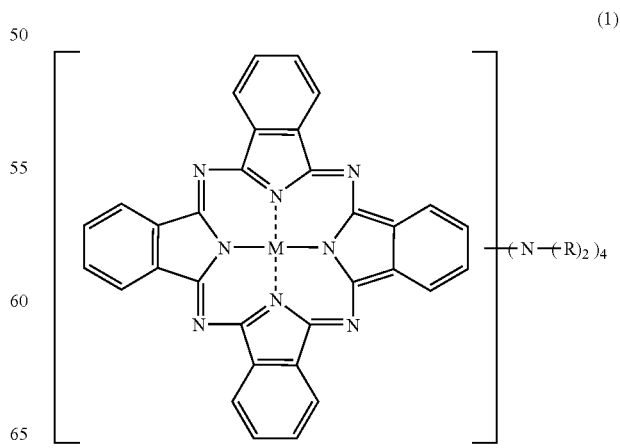

(1)

(Wherein, each R independently shows a carboxyethyl group, an acyl group, or a hydrogen atom, provided that at least one of them is an acyl group and at least one of them is a carboxyethyl group; and M shows a metal atom).

3. The phthalocyanine compound or the salt thereof according to item 2, wherein M in Formula (1) is nickel, copper, zinc, aluminum, iron or cobalt.

4. The phthalocyanine compound or the salt thereof according to item 2 or 3, wherein R in Formula (1) is one kind of acyl group selected from the group consisting of an optionally substituted, saturated or unsaturated, branched, chain or cyclic alkyl carbonyl group; an optionally substituted, saturated or unsaturated, branched, chain or cyclic alkyl sulfonyl group; an optionally substituted benzoyl group; and an optionally substituted phenyl sulfonyl group.

5. The phthalocyanine compound or the salt thereof according to item 1 or 2, wherein said acyl group is an aliphatic or aromatic acyl group of C1–C6 which may have a carboxyl group as a substituent.

6. The phthalocyanine compound or the salt thereof according to any one of items 2 to 5, wherein said metal atom is copper.

7. The salt of a phthalocyanine compound according to any one of items 2 to 6, wherein a solubility thereof to water is 2% by weight or more.

8. A phthalocyanine compound or the salt thereof obtained by reacting metal aminophthalocyanines with an acylating agent and a carboxyethylating agent.

9. The phthalocyanine compound or the salt thereof according to item 8, wherein said acylating agent is an acetic acid, a trimellitic acid, or the reactive derivatives thereof.

10. The phthalocyanine compound or the salt thereof according to item 8, wherein said carboxyethylating agent is an acrylic acid.

11. The phthalocyanine compound or the salt thereof according to any one of items 8 to 10, wherein said acylating agent and carboxyethylating agent are reacted in such amounts that amino groups of aminophthalocyanines are substituted by acyl groups in 1–60 mol % and by carboxyethyl groups in 40–99 mol %.

12. A water-based ink composition comprising the phthalocyanine compound or the salt thereof according to any one of items 1 to 11.

13. The water-based ink composition according to item 12, wherein said salt of the phthalocyanine compound is an alkanolamine salt, an alkali metal salt, or an ammonium salt of the phthalocyanine compound.

14. The water-based ink composition according to item 12 or 13, wherein said salt of the phthalocyanine compound is an ammonium salt of the phthalocyanine compound.

15. The water-based ink composition according to any one of items 12 to 14, comprising water and water-soluble organic solvent(s).

16. The water-based ink composition according to any one of items 12 to 15, wherein content of inorganic salt(s) in the water-based ink composition is 1% by weight or less.

17. The water-based ink composition according to any one of items 12 to 16, wherein the water-based ink composition is an ink for ink-jet recording.

18. A method for ink-jet recording by jetting ink droplets on a recording material in response to recording signals, characterized by using the water-based ink composition according to any one of items 12 to 17 as ink.

19. The method for ink-jet recording according to item 18, wherein said recording material is an information transmission sheet.

20. A tank containing the water-based ink composition according to any one of items 12 to 17.

21. An ink-jet printer set with the tank according to item 20.

22. A colored product comprising the phthalocyanine compound or the salt thereof according to any one of items 1 to 11.

23. A method for manufacturing a phthalocyanine compound or the salt thereof by acylating and carboxyethylating aminophthalocyanines.

24. A black metal phthalocyanine colorant which is obtained by acylating and carboxyethylating aminophthalocyanines.

25. The black metal phthalocyanine colorant according to item 24, wherein said compound having the phthalocyanine structure is a phthalocyanine compound or the salt thereof having an acylamino group and a carboxyethylamino group as substituents on the phthalocyanine structure.

BEST MODE FOR CARRYING OUT THE INVENTION

Figure 1:
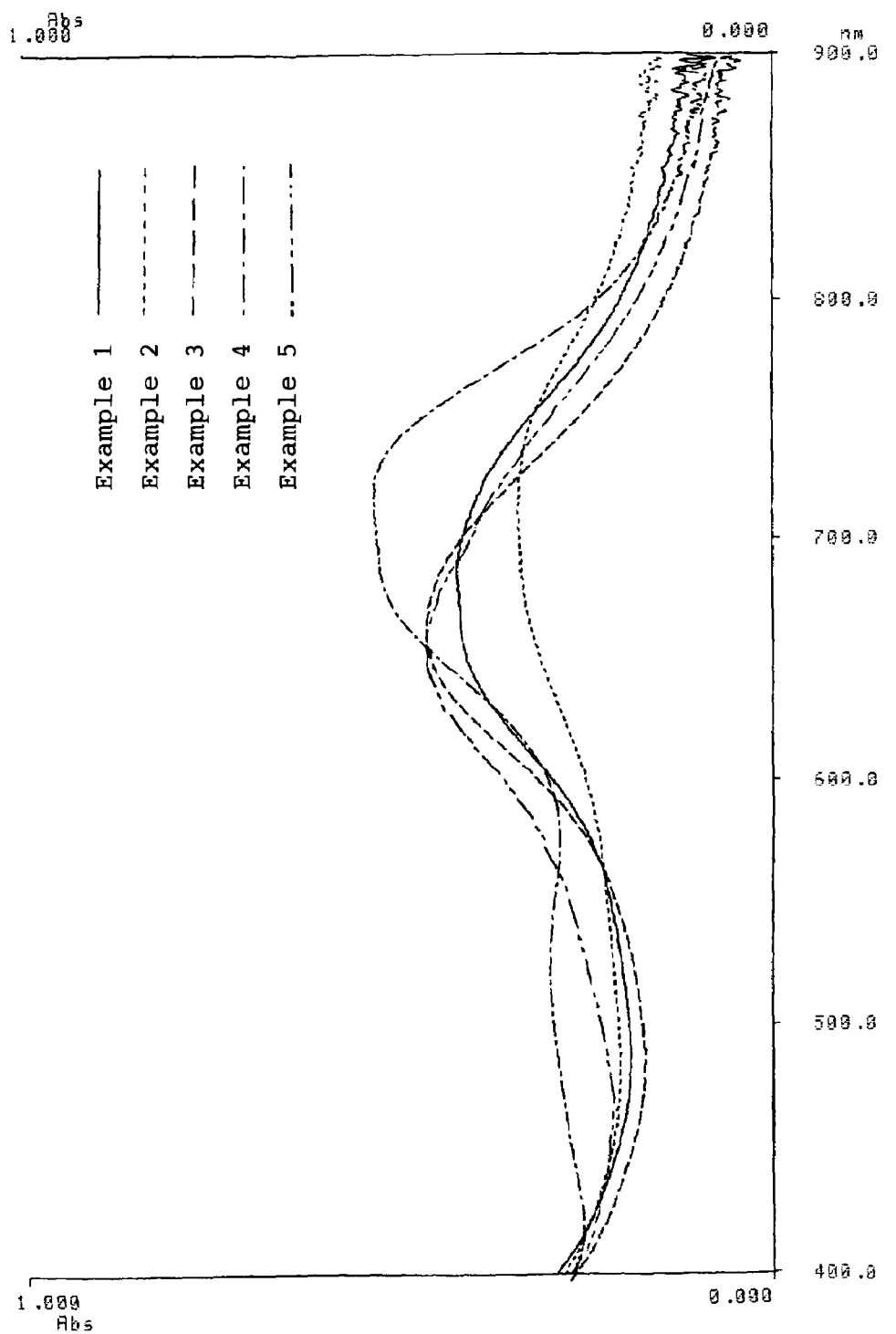
FIG. 1 shows the visible-infrared absorption spectrum measured by spectrophotometer of the compounds obtained in Example 1 to 5 of the present invention.

A phthalocyanine compound (hereinafter including the salt thereof, unless otherwise specified) of the present invention is a compound which has both substituents of a carboxyethylamino group (an amino group substituted with a carboxyethyl group (—CH2CH2COOH)) and an acylamino group (an amino group substituted with an acyl group) or, in some cases, an amino group substituted with both a carboxyethyl group and an acyl group as a substituent on the metal phthalocyanine structure.

Further, in the present invention, 'carboxyethylamino group(s)' or 'acylamino group(s)' are used in the meaning including monosubstituted amino, disubstituted amino and a carboxyethyl (acyl) amino group. Furthermore, the term of 'acyl' in the present invention is used in the meaning including not only aliphatic or aromatic acyl but also aliphatic or aromatic sulfonyl in a broad sense.

A phthalocyanine compound of the present invention can be obtained by reacting phthalocyanines having amino groups (hereinafter also said aminophthalocyanines), preferably phthalocyanines having from 2 to 4 amino groups, with an acylating agent and a carboxyethylating agent in optional order. Generally, said aminophthalocyanines are reacted with an acylating agent first and then with a carboxyethylating agent, or contrary, are reacted with a carboxyethylating agent first and then with an acylating agent, though it is not limited to the said methods. The aminophthalocyanines used as a raw material are usually synthesized by reduction of phthalocyanines having a nitro which is a precursor, so the number of amino groups can be changed by changing the molar ratio of phthalic acids and nitro phthalic acids at the time of synthesis of the precursor. For example, a nitro phthalic acid is singly used for the synthesis to obtain a phthalocyanine having four nitro groups; and a nitro phthalic acid and a phthalic acid are used by the molar ratio of 3 to 1 to obtain a phthalocyanine having on the average three nitro groups. The obtained phthalocyanine having nitro groups is reduced by the known method to obtain aminophthalocyanines having amino groups whose number corresponds to the number of nitro groups.

The compound of the present invention is obtained by acylating and carboxyethylating aminophthalocyanines, wherein the reaction is carried out in order of acylation and carboxyethylation, or in order of carboxyethylation and acylation as mentioned above. In case acylation is conducted prior to carboxyethylation, controlling of the number of places to react in the following carboxyethylation (the rate of carboxyethylation) is possible by controlling of the amount of acylating agent to amino groups of aminophthalocyanines and a stable industrial production is possible. On the other hand, in case acylation is conducted after carboxyethylation, it is possible to acylate the residual amino groups after carboxyethylation of aminophthalocyanines to inactive acylamino groups. Consequently, when an ink is prepared using the obtained compound, the formation of a salt between residual amino groups and carboxyethyl groups is prevented, so that the storage stability of ink can be improved. Further, the use of a compound having two or more carboxyl groups per molecule such as an acid anhydride as an acylating agent has an advantage of being obtainable a colorant of blue-tinged hue without cutting down the number of carboxyl groups per molecule.

The novel phthalocyanine compound of the present invention is useful as a novel colorant, especially a black colorant or a black dye because of its alkali solubility and its good various fastness.

The method for production of the compound of the present invention will be illustrated in more detail. A phthalocyanine compound having a nitro group, used as a raw material for the phthalocyanine compound of the present invention, has various ways to be synthesized. In consideration of production cost and so on, the prior known urea method is preferred as a method for synthesizing the said compound. In more detail, the compound is obtained by carrying out reaction using an unsubstituted phthalic acid or phthalimide and a phthalic acid or phthalimide having a nitro group in optional molar ratio, using salt of desired central metal such as copper chloride or zinc sulfate, urea and molybdate as catalysts in a high-boiling point solvent at 150° C. or more, preferably in the range of 160° C. to 220° C. Nickel, copper, zinc, aluminum, iron or cobalt is preferred as the central metal of the phthalocyanine compound of the present invention. Copper is especially preferred among them.

The high-boiling point solvent used for the said reaction is, for example, though not limited to, dichlorobenzene, trichlorobenzene, nitrobenzene, sulfolane, 1,3-dimethyl-2-imidazolidinone or triglyme. The said solvent may be used in such amount necessary to keep flowability to stir in the reaction system, that is, 1 to 10 times, preferably 2 to 6 times, by weight of the total amount of phthalic acids and nitro phthalic acids.

The nitro phthalocyanines thus synthesized are filtered followed by optionally washing with alcohols, a dilute acid aqueous solution or a dilute alkali aqueous solution and drying to utilize for producing the compound of the present invention.

The phthalocyanine compound containing nitro groups which is obtained in the above is made into an amino compound by reducing the nitro groups thereof.

Among various known methods for reduction, considering economical efficiency, methods using reducing agents such as sodium sulfide and sodium hydro sulfide are handy, though it is not limited to the said methods.

To be specific, nitro phthalocyanines are suspended in water, followed by adding a reducing agent, such as sodium sulfide or sodium hydro sulfide, in an amount of 1.0 to 2.0 times by mole of the equivalent of the nitro groups, and further heating to ordinary temperature or to 100° C. or below, preferably not more than 80° C. Even if the unreduced nitro group is remaining, there is no problem to use as long as they give substantially no obstacle to the present invention. The nitro group can be detected by the ESI mass spectrum of the obtained compound.

Aminophthalocyanines obtained according to above-mentioned procedures may be acylated firstly and then carried out addition reaction with an acrylic acid or may be carried out addition reaction with an acrylic acid and then acylated.

First, the method for carrying out firstly acylation will be illustrated.

An acylation reaction is carried out by suspending or partially dissolving aminophthalocyanines in a solvent, preferably water or a polar solvent, such as DMF (dimethylformamide), DMSO(dimethylsulfoxide), NMP(N-methylpyrrolidone), DMI (dimethyl imidazolidinone), sulfolane, methyl ethyl ketone or acetic acid; followed by adding an acylating agent in an adequate amount, for example, in 1–70 equivalent % or preferably 10–60 equivalent % to amino groups of the aminophthalocyanines and heating. In case an acid anhydride is used as an acylating agent, the reaction is an addition reaction. Therefore, aminophthalocyanine, the said solvent and an acid anhydride may be just put together to stir with heating for several hours. When an acid halide is used as an acylating agent, it is preferable to carry out the acylation reaction in the presence of a base, for example, an organic base such as pyridine or triethylamine, or an inorganic base such as caustic soda, sodium hydrogencarbonate, sodium carbonate, potassium carbonate or magnesium oxide. The reaction temperature of acylation is usually about 30° C. to 120° C., preferably 50° C. to 100° C., though it is not limited to the said range of temperature unless undesirable reactions such as side reactions are produced.

Although acylated aminophthalocyanines obtained according to above-mentioned procedures may be isolated, preferably without isolating, carboxyethylation is carried out usually by adding an acrylic acid to the reaction solution after the acylation reaction has finished. In this case, an acrylic acid is added to the reaction solution after acylation in an adequate amount, and reacted preferably under heating so as to minimize the number of free amino groups in order to obtain the compound of the present invention. The amount of acrylic acid to be added in the above case may be 0.2 equivalent or more, preferably 0.5 equivalent or more, more preferably 1 equivalent or more based on the amino groups prior to acylation. It is usually in the range of 0.5–50 equivalent, or preferably 1–30 equivalent. The reaction is conducted preferably under heating, usually at temperatures of 50° C. to 120° C., preferably about 60° C. to 100° C. It is also preferable to carry out the carboxyethylation in the presence of a polymerization inhibitor such as oxygen, methoquinone or hydroquinone for the purpose of preventing the acrylic acid from polymerizing. When the reaction is conducted in the presence of oxygen, usually air may be bubbled into the reaction system. When the reaction is conducted in the presence of a polymerization inhibitor other than oxygen, the polymerization inhibitor is added in an amount of about 0.01–5%, preferably about 0.02–2% based on the mass of acrylic acid.

Depending on the circumstances, acylated aminophthalocyanines may be isolated by filtration or other means before the reaction with an acrylic acid. The isolated acylated aminophthalocyanines, which can be used in the state of a wet cake as it is or be used after being dried, is first suspended or dissolved in a solvent, such as an acrylic acid (i.e. a raw material) or a solvent which is basically inactive to acrylic acids, preferably such as the above-mentioned polar solvent, water, DMF, NMP, sulfolane, DMI, methyl ethyl ketone or acetic acid. And then, in case an acrylic acid is used as a solvent, the above-mentioned polymerization inhibitor is added to the solvent if necessary and thereafter the reaction may be carried out. When the solvent is other than a crylic acids, an acrylic acid and if necessary the above-mentioned polymerization inhibitor are added to the solvent and then reaction may be carried out. A solvent may be used singly, or two or more solvents may be used together as well. Reaction conditions such as reaction temperatures and amounts of the raw material are identical to those described in the above-mentioned reaction wherein acylated aminophthalocyanines are used without being isolated. For example, the reaction temperature is usually 50° C. to 120° C., preferably 60° C. to 100° C. The amount of acrylic acid used at this reaction is 0.5 equivalent or more, preferably 0.5 to 50 equivalent, further in view of economic advantageousness, the most preferably 1 to 30 equivalent based on the amino groups prior to acylation. The amount of acrylic acid is not limited in particular, as long as it is used in an amount necessary to achieve carboxyethylation of acylated aminophthalocyanines substantially.

Next, the case that aminophthalocyanines are reacted with an acrylic acid firstly will be illustrated.

In order to conduct reaction of aminophthalocyanines with an acrylic acid at the beginning, aminophthalocyanines are first suspended or dissolved in a solvent, such as an acrylic acid (i.e. a raw material) or a solvent which is substantially inactive to acrylic acids or other raw materials, preferably such as the above-mentioned polar solvent, water, DMF, NMP, sulfolane, DMI, methyl ethyl ketone or acetic acid. And then, in case an acrylic acid is used as a solvent, the above-mentioned polymerization inhibitor is added if necessary, and thereafter reaction is carried out. When the solvent is other than acrylic acids, an acrylic acid and, if necessary, the above-mentioned polymerization inhibitor are added to the solvent and reaction is carried out. Thereby carboxyethylated aminophthalocyanines can be obtained. In this case, there is a possibility that the black dye will show black hue tinged with red if carboxyethylation is done overmuch. When the reaction carried out using an acrylic acid in an amount of a small excess equivalent based on the amino groups of aminophthalocyanines at the temperature of about 80° C. for 12 to 16 hours, the carboxyethylation rate becomes stable. (It seems that on the average about 60–80% of the amino groups are carboxyethylated.) For that reason, it is preferable to control the reaction watching the state of reaction solution on the basis of the state in the stable carboxyethylation rate such that carboxyethylation proceeds appropriately.

The next acylation step can be carried out by isolating the reactant from the reaction solution, suspending or dissolving the isolated reactant in a solvent and then adding an acylating agent thereto to acylate the above reactant, or by adding an acylating agent directly to the reaction solution to acylate the above reactant.

In case an acylating agent is directly added to the reaction solution, the acylating agent may be just added in the said solution as it is. In case the reactant is isolated, the wet cake isolated by filtration and so on or a dried product thereof is suspended or partially dissolved in a solvent, preferably a polar solvent, such as water, DMF, NMP, DMI, DMSO, sulfolane, methyl ethyl ketone or acetic acid, followed by adding a suitable acylating agent to react with the said reactant and thereby to acylate it. The addition amount of the acylating agent is not limited in particular, as lonf as it is used in an amount able to acylate the amino groups of said reactant in an adequate amount. The amount is preferably such an amount that not less than 10% of the whole amino groups of the aminophthalocyanine used as the raw material are acylated, more preferably such an amount that all the amino groups remaining without being carboxyethylated are acylated. The reaction is conducted usually under heating.

In case an acid anhydride is used as an acylating agent as the reaction, that is an addition reaction, an aminophthalocyanine, a predetermined solvent and an acid anhydride can be just put together to stir with heating for several hours. When an acid halide is used as an acylating agent, it is preferable to carry out the acylating reaction in the presence of a base as mentioned above. The said base includes, though not limited to, an organic base such as pyridine or triethylamine, or an inorganic base such as caustic soda, sodium hydrogencarbonate, sodium carbonate, potassium carbonate or magnesium oxide. The reaction temperature is usually 30° C. to 120° C. or preferably 50° C. to 100° C.

The acyl groups of the phthalocyanine compound of the present invention are determined by the acylating agent; and include any groups derived from a dicarboxylic acid anhydride or a tricarboxylic acid anhydride, or sulphonyl groups derived from a sulfonic acid such as an alkylsulfonic acid or an aromatic sulfonic acid or the chloride thereof. The said acyl group includes an aliphatic or aromatic carbonyl group having optionally a substituent, or an aliphatic or aromatic sulfonyl group having optionally a substituent. The carbon number in the said aliphatic group (a group that a carbonyl group is removed from the aliphatic carbonyl group) is usually C1–C20, preferably C1–C6, and the carbon number in the said aromatic group (a group that the carbonyl group is removed from the aromatic carbonyl group) is usually C5–C20, preferably C5–C6. The said groups may contain a substituent. In some cases, the said groups which contain a substituent such as a carboxyl group are rather preferred. To be more specific, the said acyl group includes a saturated or unsaturated branched, chain or cyclic alkyl carbonyl group; a substituted or unsubstituted, saturated or unsaturated branched, chain or cyclic alkyl sulfonyl group; a substituted or unsubstituted benzoyl group; and a substituted or unsubstituted sulfonyl group. Above all, a saturated or unsaturated C1–C17 alkyl carbonyl group, such as an acetyl group, a propionyl group, a butyryl group, a valeryl group, a palmitoyl group, a stearoyl group and an oleoyl group, preferably a saturated or unsaturated $C_1$–$C_4$ alkyl carbonyl group having optionally a carboxy substituent or a benzoyl group having a substituent such as a mono- or di-carboxy benzoyl group are preferred.

Although the amount of the acylating agent depends on the ratio of carboxyethylation and the reactivity of acylating agent, it is used in such amounts as to allow 5–60%, preferably 10–55%, or in some cases 10–30 mol % (the total molar number of an acyl group (R) contained by the obtained phthalocyanine compound/the molar number of all Rs), preferably 12.5–25 mol % of all Rs in Formula (1) to be acylated.

The acylating agent includes an aliphatic or aromatic carboxylic acid, an aliphatic or aromatic sulfonic acid, or the reactive derivatives thereof, for example, an acid chloride, an acid anhydride or the like. The carbon number in the said aliphatic group (a group that the carbonyl group is removed from the aliphatic carbonyl group) is usually C1–C20, preferably C1–C6. The carbon number of the said aromatic group (a group that the carbonyl group is removed from the aromatic carbonyl group) is usually C5–C20, preferably C5–C6. The said groups may have a substituent. In some cases, the said groups which have a substituent such as a carboxyl group are rather preferred. The acid anhydride includes, though not limited to, acetic anhydride, propionic anhydride, maleic anhydride, phthalic anhydride, trimellitic anhydride, hexahydro phthalic anhydride, tetrahydro phthalic anhydride, succinic anhydride, methylhexahydro phthalic anhydride, methyltetrahydro phthalic anhydride, benzoic anhydride, or 2-sulfobenzonic acid anhydride. The acid halide includes, though not limited to, acetyl chloride, propionyl chloride, chloride acrylate, benzoyl chloride, benzene sulfonic acid chloride, or tosyl chloride.

The carboxyethylated and acylated compound of the present invention obtained according to the above is separated from the solution by filtration or other means. The compound of the present invention suitable for ink or the like can be obtained by washing the said compound with an organic solvent such as alcohol and then with water, or washing the said compound only with water to remove inorganics or other impurities.

The compound of the present invention thus obtained is generally a free acid or the salt thereof. In addition, for converting to the desired salt, a desired organic or inorganic base can be reacted with the obtained free acid of the compound (or a free acid made from the obtained salt of the compound by acidic separation). The organic or inorganic base includes, though not limited to, an alkanolamine (preferably, a C1–C6 mono-, di-, or tri-lower alkanolamine, more preferably a C2–C3 dialkanolamine) such as diethanolamine and triethanolamine; an alkali metal hydroxide such as lithium hydroxide, sodium hydroxide and potassium hydroxide; ammonium hydroxide; or an alkali metal carbonate such as lithium carbonate, sodium carbonate and potassium carbonate.

The compound of the present invention thus obtained can be used for ink after being dried or in the state of a wet cake as it is.

The water-based ink composition of the present invention is an aqueous solution dissolving the phthalocyanine compound of the present invention, preferably the water-soluble salt thereof (hereinafter a phthalocyanine compound can be used in the same meaning including the salt thereof) in water or a water-soluble solvent (a water-soluble or water-miscible organic solvent containing water), or preferably in both water and the same solvent. The water-soluble salt of the phthalocyanine compound of the present invention suitable for the water-based ink composition has generally a water-solubility of 2% by weight or more, preferably of 3% by weight or more, more preferably of 5% by weight or more. The preferable salt includes, for example, an alkanolamine salt, an alkali metal salt such as lithium, potassium and sodium, and an ammonium salt of the compound of the present invention mentioned above. An ammonium salt has desirable effect especially in respect of water fastness in some cases. The water-based ink composition has preferably a pH of about 6–11. The water-based ink composition, if used as the ink for an ink-jet printer, contains inorganic material(s) such as the chloride or sulfate of a metal cation preferably in an amount as little as possible. The content for goal is, for example, roughly 1% by weight or less, preferably in 0.1% by weight or less based on the composition. The reaction product can be washed with water to obtain the phthalocyanine compound suitable for a water-based ink composition of the present invention containing little inorganic material. If it is required to prepare a phthalocyanine compound containing further less inorganic material, the reaction product may be desalted, for example, by conventional reverse osmosis or by stirring the dry product or the wet cake of the phthalocyanine compound in a mixed solvent of water and alcohol such as methanol, followed by filtering and drying.

The water-based ink composition of the present invention is prepared by using water as a medium. The phthalocyanine compound of the present invention is roughly contained preferably in 0.1–20% by weight, more preferably in 1–10% by weight, and more preferably in 2–8% by weight in the water-based ink composition. Further 0–30% by weight of a water-soluble organic solvent, 0–5% by weight of an ink regulator may be roughly contained in the water-based ink composition of the present invention. The remainder is water.

The water-based ink composition of the present invention is prepared by adding the phthalocyanine compound of the present invention and, if necessary, water-soluble organic solvent(s) and additives for preparation of ink described below, to water containing no impurity such as distilled water and mixing. The compound of the present invention or the salt thereof may be added to dissolve in a mixture of water, the water-soluble organic solvent and the additives for preparation of ink described below. After the ink composition of the present invention is obtained, it may be filtered to remove impurities if necessary.

The water-soluble organic solvent includes a C1–C4 alkanol such as methanol, ethanol, propanol, isopropanol (IPA), butanol, isobutanol, secondary butanol and tertiary butanol; a carboxylic amide (preferably a C1–C3 lower carboxylic N,N-mono- or N,N-di-C1–C3 alkylamide) such as N,N-dimethylformamide and N,N-dimethylacetoamide; a lactam (preferably a 4–7 membered lactam) such as ε-caprolactam or N-methylpyrrolidin-2-one(N-methylpyrrolidone); a cyclic urea (preferably a 5–6 membered cyclic urea having optionally a C1–C3 alkyl substituent) such as 1,3-dimetylimidazolidin-2-one and 1,3-dimethylhexahydropyrimid-2-one; a ketone or a keto-alcohol (preferably a $C_3$–$C_6$ ketone or keto-alcohol) such as acetone, methyl ethyl ketone, and 2-methyl-2-hydroxypentan-4-one; a cyclic ether (preferably a 5–6 membered cyclic ether) such as tetrahydrofurananddioxane; a monomer, oligomerorpolymer of alkylene glycol or alkylene thioglycol (polyalkylene glycol or polyalkylene thioglycol) having C2–C6 alkylene units, such as ethylene glycol, ethylene thioglycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; a polyol (preferably a C1–C6 triol) such as glycerin and hexane-1,2,6-triol; an (C1–C4) alkyl ether of polyhydric alcohol (preferably the (C1–C4) alkyl ether of a (C2–C3) polyhydric alcohol having 1–3 hydroxyl groups) such as ethylene glycol monomethyl ether, ethylene glycol monoethyl ether, ethylene glycol monobutyl ether (butyl carbitol), diethylene glycol monomethyl ether, diethylene glycol monoethyl ether, triethylene glycol monomethyl ether, and triethylene glycol monoethyl ether; γ-butyrolactone; and dimethylsulfoxide.

The additives for preparation of ink includes a preservative, a pH adjusting agent, a chelating reagent, a rust preventive, a water-soluble ultraviolet absorbing agent, a water-soluble polymeric compound, a dye dissolving agent, a surfactant and other additives for preparation of ink.

The preservative includes sodium dehydroacetate, sodium sorbate, sodium 2-pyridinethiol-1-oxide, sodium benzoate, sodium pentachlorophenol and 1,2-benzisothiazoline-3-one.

The pH adjusting agent includes any substance that can control the ink pH within a range of 6 to 11 as long as it gives no adverse effect on the ink preparation. The examples are alkanolamines such as diethanolamine and triethanolamine; alkali metal hydroxides such as lithium hydroxide, sodium hydroxide, and potassium hydroxide; ammonium hydroxide; or alkali metal carbonates such as lithium carbonate, sodium carbonate and potassium carbonate. The water-based ink composition of the present invention, especially if adjusted in pH with ammonium hydroxide, can provide a printed matter with excellent water fastness because the ammonium ion evaporates as the ammonia into a recording material in printing.

The chelating reagent includes sodium ethylenediamine tetraacetate, sodium nitrilo triacetate, sodium hydroxyethyl ethylenediamine triacetate, sodium diethylene triamine pentaacetate, and sodium uracyl diacetate. The rust preventive includes acidic hyposulfite salts, sodium thiosulfate, ammonium thioglycolate, diisopropyl ammonium nitrite, tetranitrate pentaerythritol, and dicyclohexyl ammonium nitrite. The water-soluble polymeric compound includes polyvinyl alcohol, a cellulose derivative, a polyamine, and a polyimine. The water-soluble ultraviolet absorbing agent includes sulfonated benzophenone, and sulfonated benzotriazole. The dye dissolving agent includes ε-caprolactam, ethylene carbonate, and urea. The surfactant includes an anionic, cationic, or nonionic publicly known surfactant.

A recording material (base material) for ink-jet recording method of the present invention includes an information transmission sheet such as paper and film, fiber and leather. The information transmission sheet is preferably surface-treated and, practically, it has an ink-acceptable layer on the base material. The ink-acceptable layer can be supplied, for example, by impregnating or coating a cationic polymer on the above basement material; or by coating an inorganic fine grain being enable to absorb the dyestuff from an ink such as porous silica, alumina sol and special ceramic together with a hydrophilic polymer such as polyvinyl alcohol and polyvinyl pyrrolidone on a surface of the above basement material. The sheet supplied with the ink-acceptable layer is generally called an ink-jet special paper (film) or a glossy paper (film), and is available on the market, for example, as Pictorico (by Asahi Glass KK), Color BJ Paper, Color BJ Photofilm sheet (by Canon KK), Color Image Jet special paper (by Sharp KK), Superfine special glossy film (by Seiko Epson KK) and Pictafine (by Hitachi Maxell KK). The ink-jet recording method can of course be applied for a plain paper.

In the ink-jet recording method of the present invention, the water-based ink composition of the present invention is used as a water-based ink composition that is used in a general method for recording by ejecting ink droplets which consist of a water-based ink composition responding to the record signal to record onto a recording material such as mentioned above.

The water-based ink composition of the present invention may contain one or more of the other compounds in addition to the phthalocyanine compound of the present invention so as to fit for printing, copying, marking, writing, drawing, stamping, and recording, especially ink-jetting. Such a composition can provide a black printed matter with a high density and a high quality in fastness to water, sun light and abrasion. The phthalocyanine compound of the present invention has the better water fastness and light fastness on a plain paper, especially on a special paper for ink-jet recording.

The water-based ink composition of the present invention brings about no separation by deposition during the storage because of high water solubility. The water-based ink composition of the present invention, if used in an ink-jet printer, brings about no clogging at the jetting nozzles and, even if used for a relatively long time (by a constant recycling or with an intermittent intercept), does not show a change in physical property such as decomposition or lowering color yield.

The tank of the present invention contains the above water-based ink composition. The ink-jet printer of the present invention is what the tank of the present invention containing the water-based ink composition is set in the ink-tank section thereof. The colored product of the present invention is what is colored with the above phthalocyanine compound of the present invention or the salt thereof, preferably with the above water-based ink composition.

The water-based ink composition of the present invention has an ideal black color close to the standard in JAPAN COLOR of JNC (Japan Printing Machinery Manufacturers Association), shows the stable black color under various light sources and is excellent in color rendering property. Furthermore, the water-based ink composition of the present invention, if used together with a known magenta, cyan or yellow color having an excellent light fastness and water fastness, can provide a color recorded matter with an excellent light fastness and water fastness.

The phthalocyanine compound of the preset invention has a high absorption in a near-infrared region and so is suitable for printing a bar code to read by near-infrared ray, effecting the water-based ink composition of the present invention to be very useful.

EXAMPLE

The present invention will be described below in more details with reference to Examples. "part" and "%" in the description are shown by weight unless otherwise specified.

Example 1

15 parts of tetramino copper phthalocyanine (0.0236 mol), 9 parts of trimellite anhydride (0.0468 mol) and 120 parts of DMF were put in a four-neck flask equipped with a condenser, followed by elevating the temperature to 80° C. by a mantle heater and further stirring at the same temperature for 6 hours. After the reaction finished, the reaction solution was cooled down to 40° C., followed by dropping 40 parts of water slowly thereto to thoroughly precipitate the dissolving product, which was filtered by a Nutsche funnel and further washed with 300 parts of methanol and 500 parts of hot water to separate the reaction product. A wet cake considered to be diamino diacylamino copper phthalocyanine was obtained.

The whole amount of the wet cake of the reaction product obtained in the above was put in a four-neck flask equipped with a condenser, followed by adding 120 parts of acrylic acid (1.66 mol), 20 parts of methyl ethyl ketone and 0.8 parts of hydroquinone to make a suspension, elevating the temperature to 80° C. by a mantle heater and further stirring at the same temperature for 8 hours to carry out carboxyethylation of amino groups. After the reaction finished, the reaction solution was cooled down to ordinary temperature and filtered by a Nutsche funnel to separate the reaction product, which was washed with 500 parts of water and dried to obtain 23 parts of black copper phthalocyanine compound. Judging from the reaction, various mixture though it is, the reaction product seems to be a compound that two acyl groups (dicarboxybenzoyl) and two carboxyethyl per molecule are introduced on average into tetraminophthalocyanine, namely corresponding to bis(dicarboxybenzoylamino) bis(2-carboxyethylamino) copper phthalocyanine.

Example 2

15 parts of tetramino copper phthalocyanine (0.0236 mol), 4.5 parts of trimellite anhydride (0.0236 mol) and 120 parts of DMF were put in a four-neck flask equipped with a condenser, followed by elevating the temperature to 80° C. by a mantle heater and further stirring at the same temperature for 6 hours. After the reaction finished, the reaction solution was cooled down to 40° C., followed by dropping 40 parts of water slowly thereto to thoroughly precipitate the dissolving product, which was filtered by a Nutsche funnel and further washed with 300 parts of methanol and 500 parts of hot water to separate the reaction product. A wet cake of a compound considered to be triamino monoacylamino copper phthalocyanine was obtained.

The whole amount of the wet cake obtained in the above was put in a four-neck flask equipped with a condenser, followed by adding 120 parts of acrylic acid (1.66 mol), 20 parts of methyl ethyl ketone and 0.8 parts of hydroquinone to make a suspension, elevating the temperature to 80° C. by a mantle heater and further stirring at the same temperature for 8 hours to carry out carboxyethylation of amino groups. After the reaction finished, the reaction solution was cooled down to ordinary temperature and filtered by a Nutsche funnel to separate the reaction product, which was washed with 500 parts of water and dried to obtain 21 parts of black copper phthalocyanine compound. Judging from the reaction, various mixture though it is, the reaction product seems to be a compound that one acyl group (carboxybenzoyl) and three carboxyethyl per molecule are introduced on average into tetraminophthalocyanine, namely corresponding to mono(dicarboxybenzoylamino) tri(2-carboxyethylamino) copper phthalocyanine.

Example 3

180 parts of water wet cake containing 34.2 parts of tetramino copper phthalocyanine (0.054 mol), 0.2 parts of hydroquinone, 19.7 parts of acrylic acid (0.274 mol), 88.6 parts of acetic acid, 134 parts of water and 14 parts of methyl ethyl ketone were put in a four-neck flask equipped with a condenser, followed by elevating the temperature to 80° C. by a mantle heater and further stirring at the same temperature for 16 hours to carry out carboxyethylation of amino groups. Although the reaction product is not supposed to be a single compound, considering the use ratio and the reactivity of raw materials, and the condition of reaction, the reaction product seems to be a compound that carboxyethyl is introduced on average to three of its amino groups in tetramino copper phthalocyanine, namely corresponding to monoamino tri(2-carboxyethylamino) copper phthalocyanine. After the reaction finished, the reaction solution was cooled down to 40° C., followed by adding 11.1 parts of acetic anhydride (0.109 mol), elevating the temperature to 80° C. by a mantle heater and further stirring at the same temperature for 5 hours to carry out acylation. After the reaction finished, the solution was cooled down to ordinary temperature and filtered by a Nutsche funnel to separate the reaction product, which was washed with 500 parts of water and dried to obtain 42 parts of black copper phthalocyanine compound. Judging from the reaction, mixture of several compounds though it is, the reaction product seems to be a compound that one acyl group (acetylamino) and three carboxyethyl per molecule on average into tetraminophthalocyanine, namely corresponding to mono (acetylamino) tri(2-carboxyethylamino) copper phthalocyanine.

Example 4

180 parts of water wet cake containing 34.2 parts of tetramino copper phthalocyanine (0.054 mol), 0.2 parts of hydroquinone, 19.7 parts of acrylic acid (0.274 mol), 88.6 parts of acetic acid, 134 parts of water and 14 parts of methyl ethyl ketone were put in a four-neck flask equipped with a condenser, followed by elevating the temperature to 80° C. by a mantle heater and further stirring at the same temperature for 16 hours to carry out carboxyethylation of amino groups. As well as Example 3, the reaction product seems to be monoamino tri(2-carboxyethylamino) copper phthalocyanine. After the reaction finished, the reaction solution was cooled down to 40° C., followed by adding 51 parts of acetic anhydride (0.5 mol), elevating the temperature to 80° C. by a mantle heater and further stirring at the same temperature for 5 hours to carry out acylation. After the reaction finished, the reaction solution was cooled down to ordinary temperature and filtered by a Nutsche funnel to separate the reaction product, which was washed with 500 parts of water and dried to obtain 44 parts of black copper phthalocyanine compound. Judging from the added amount of acetic anhydride, visual observations of the reaction solution and the fact that a larger amount of reaction product was obtained compared with Example 3, the reaction product is considered a phthalocyanine compound which is acylated more than Example 3. Accordingly, the reaction product is considered a phthalocyanine compound of the present invention having di-substituted amino groups such as diacetylamino groups or acetyl(2-carboxyethyl) amino groups.

Example 5

300 parts of wet cake containing 53.6 parts of tetramino copper phthalocyanine (0.085 mol) were suspended in 360 parts of water in a four-neck flask equipped with a condenser, followed by heating to 60° C. with stirring, dropping 9.5 parts of acetic anhydride (0.093 mol) at the same temperature and stirring at the same temperature for 5 hours. Successively 0.2 parts of hydroquinone and 95.4 parts of acrylic acid (1.66 mol) were added, followed by heating to 80° C. and stirring with keeping the same temperature for 12 hours. Judging from the reaction, mixture of several compounds though it is, the reaction product is found to correspond to a compound which comprises tetramino phthalocyanine having on average one introduced acyl group (acetylamino) and three introduced carboxyethyl per molecule, namely the desired monoacetylamino(2-tricarboxyethylamino) copper phthalocyanine. After the reaction finished, the reaction solution was cooled down to ordinary temperature and filtered by a Nutsche funnel to separate the product, which was washed with 500 parts of water and dried to obtain 73 parts of the desired black copper phthalocyanine compound, which had a water-solubility of about 10% by mass at the ordinary temperature.

The ammonium salts of the compounds obtained in the above examples were individually dissolved in ion-exchanged water to prepare their 0.05 g/1000 ml of solutions, of which the absorption spectra were measured by UV-2100 spectrophotometer (made by Shimazu Seisakusyo KK).

Their absorption spectra are shown in FIG. 1. It is obvious from the absorption spectra that the compounds in the above Examples 1 to 5 are most suitable for printing a bar code to read by near-infrared ray because the said compounds have a high absorption in a near-infrared region.

Example 6

(A) Preparation of Ink

The solution of the composition as described below was prepared and filtered through a 0.45 μm membrane filter to prepare the water-based ink compositions for ink-jetting. Ion-exchanged water was used. The water-based ink compositions were prepared with water and ammonium hydroxide to have a pH of 8–10 and a total amount of 100 parts.

TABLE 1

| | |
|---|---|
| The compounds obtained in Examples 1–5 | 5.0 parts each |
| Dipropylene glycol | 1.0 parts |
| Biocide | 0.1 parts |
| Rust-preventive agent | 0.1 parts |
| Surfactant | 0.1 parts |
| Water and ammonium hydroxide | 93.7 parts |
| Total | 100.0 parts |

The ink obtained in the above is stable (not gelled) for more than 6 months at ordinary temperature.

(B) Ink-Jet Printing

By using an ink-jet printer (Trade name: PICTY80L, made by NEC KK), ink-jet recording was done on a plain paper(Canon Printer Paper A4, TLB5A4S, made by Canon KK). The test results on hue, light fastness and water fastness in recorded images by the water-based ink compositions (containing the compounds of Examples 1 to 5) of the present invention are shown in Table 2.

TEST EXAMPLE

In Example 7, ink-jet recording was done by using each ink prepared with the compounds of Examples 1 to 5 in the same manner as Example 6 in order to carry out tests on hue, light fastness and water fastness in recorded images. Further an ink composition for Comparative Example 1 was prepared so as to coincide in optical density with the black ink of the present invention as in the above (A), but in place of the colorant, the ink composition contained C.I. Direct Black 19 (represented by following Formula), which is an azo colorant generally applied for a water-soluble black colorant for ink-jetting (Comparative Example 1). The same ink composition containing the colorant of Comparative Example 1 was used for ink-jet recording in order to carry out tests on hue, light fastness and water fastness in recorded images as well. All the test results are shown in Table 2.

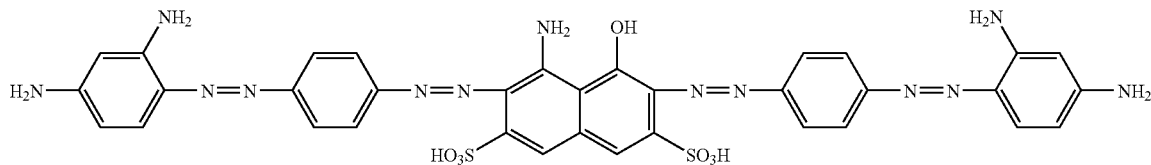

(C) Evaluation of Recorded Image (1) Hue Determination

Hue and vividness of a recorded image were determined calorimetrically using the GRETAG SPM50 (made by GRETAG KK) to calculate L*, a* and b* values.

(2) Light Fastness

A carbon arc fade meter (by Suga Testing Machine KK) was used to irradiate carbon arc on the recorded image for 20 hours. Grade was determined based on blue scale grade as prescribed in JIS L-0841. A color difference (ΔE) between before and after the irradiation was also determined by the above colorimetry system.

(3) Water Fastness

A piece of paper (a plain paper) on which a bar code-like pattern was printed 24 hours in advance was dipped in water for about 20 seconds, then was taken out and dried in order to judge the degree of bleeding of the colorant on the white places on the paper.

Standards:

◎: no bleeding

X: a large bleeding

The results on the above (1) to (3) are shown in Table 2.

TABLE 2

| | Hue | | | Light fastness Judgment | Water fastness |
|---|---|---|---|---|---|
| | L* | a* | b* | (ΔE) | |
| Example 1's Compound ink | 32.7 | −5.9 | −2.1 | Grade 4 or above (1.21) | ◎ |
| Example 2's Compound ink | 31.5 | −2.9 | −1.0 | Grade 4 or above (0.51) | ◎ |
| Example 3's Compound ink | 37.9 | −4.6 | −1.0 | Grade 4 or above (1.32) | ◎ |
| Example 4's Compound ink | 33.4 | −6.8 | −3.0 | Grade 4 or above (1.21) | ◎ |
| Example 5's Compound ink | 31.4 | −2.8 | −2.0 | Grade 4 or above (0.94) | ◎ |
| Comparative Example 1's Compound ink | 33.06 | −0.5 | −0.2 | Grade 4 or above (0.54) | X |

(The printed matter of Comparative Example 1 has bronzing.)

Table 2 reveals that the inks containing colorants of the present invention (the compounds of Examples 1 to 5) have a black hue independently and are very good in both water fastness and light fastness. Further, it was found from a visual observation of the recorded images that the inks containing colorants of the present invention have a blue-tinged black hue suitable for ink-jet recording as well as the ink containing the colorant of Comparative Example 1. On the other hand, the ink containing the colorant of Comparative Example 1, good in light fastness though it is, provides a printed matter with bronzing and is so inferior in water fastness.

INDUSTRIAL APPLICABILITY

The phthalocyanine compound of the present invention is excellent in water-solubility, shows black color independently, and is useful as a novel colorant, which can usually be utilized as a black colorant. The water-based ink composition of the present invention using the phthalocyanine compound does not show a crystal deposition after a long storage, nor a change in physical property and color, so that it has good storage stability. The water-based ink composition of the present invention, when used as a black ink for ink-jet recording, can provide a printed matter with excellence in light fastness; and further when used together with a magenta, cyan and yellow dye, can give an ink-jet recorded matter that is excellent in both light fastness and water fastness because the composition is close to a pigment in quality. The surface of a printed matter is closely an ideal black (blue-tinged black) and has excellent color rendering property. Therefore, the ink composition of the present invention is very useful as a black ink for ink-jet recording. The water-based ink composition of the present is also very effective for printing a bar code to read by near-infrared ray because the phthalocyanine compound of the preset invention has a high absorption in a near-infrared region.

What is claimed is:

1. A metal phthalocyanine compound or the salt thereof having both acylamino group(s) and carboxyethylamino group(s) as substituents on the phthalocyanine structure.

2. The phthalocyanine compound or the salt thereof according to claim 1 represented by Formula (1) as shown below:

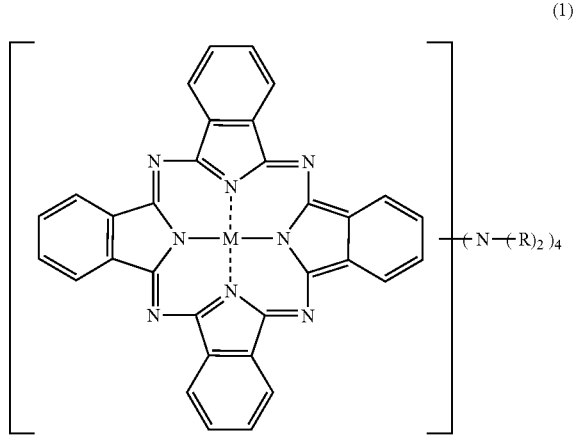

(1)

Wherein, each R independently represents a carboxyethyl group, an acyl group, or a hydrogen atom, provided that at least one of them is an acyl group and at least one of them is a carboxyethyl group; and M represents a metal atom.

3. The phthalocyanine compound or the salt thereof according to claim 2, wherein M in Formula (1) is nickel, copper, zinc, aluminum, iron or cobalt.

4. The phthalocyanine compound or the salt thereof according to claim 2 or 3, wherein R in Formula (1) is one kind of acyl group selected from the group consisting of an optionally substituted, saturated or unsaturated, branched, chain or cyclic alkyl carbonyl group; an optionally substituted, saturated or unsaturated, branched, chain or cyclic alkyl sulfonyl group; an optionally substituted benzoyl group; and an optionally substituted phenyl sulfonyl group.

5. The phthalocyanine compound or the salt thereof according to claim 1 or 2, wherein said acyl group is an aliphatic or aromatic acyl group of $C_1$–$C_6$ which may have a carboxyl group as a substituent.

6. The phthalocyanine compound or the salt thereof according to any one of claims 2 to 5, wherein said metal atom is copper.

7. The salt of a phthalocyanine compound according to any one of claims 2 to 6, wherein a solubility thereof to water is 2% by weight or more.

8. A phthalocyanine compound or the salt thereof obtained by reacting metal aminophthalocyanines with an acylating agent and a carboxyethylating agent.

9. The phthalocyanine compound or the salt thereof according to claim 8, wherein said acylating agent is an acetic acid, a trimellitic acid, or the reactive derivatives thereof.

10. The phthalocyanine compound or the salt thereof according to claim 8, wherein said carboxyethylating agent is an acrylic acid.

11. The phthalocyanine compound or the salt thereof according to any one of claims 8 to 10, wherein said acylating agent and carboxyethylating agent are reacted in such amounts that amino groups of aminophthalocyanines are substituted by acyl groups in 1–60 mol % and by carboxyethyl groups in 40–99 mol %.

12. A water-based ink composition comprising the phthalocyanine compound or the salt thereof according to any one of claims 1 to 11.

13. The water-based ink composition according to claim 12, wherein said salt of the phthalocyanine compound is an alkanolamine salt, an alkali metal salt, or an ammonium salt of the phthalocyanine compound.

14. The water-based ink composition according to claim 12 or 13, wherein said salt of the phthalocyanine compound is an ammonium salt of the phthalocyanine compound.

15. The water-based ink composition according to any one of claims 12 to 14, comprising water and water-soluble organic solvent(s).

16. The water-based ink composition according to any one of claims 12 to 15, wherein content of inorganic salt(s) in the water-based ink composition is 1% by weight or less.

17. The water-based ink composition according to any one of claims 12 to 16, wherein the water-based ink composition is an ink for ink-jet recording.

18. A method for ink-jet recording by jetting ink droplets on a recording material in response to recording signals, characterized by using the water-based ink composition according to any one of claims 12 to 17 as ink.

19. The method for ink-jet recording according to claim 18, wherein said recording material is an information transmission sheet.

20. A tank containing the water-based ink composition according to any one of claims 12 to 17.

21. An ink-jet printer set with the tank according to claim 20.

22. A colored product comprising the phthalocyanine compound or the salt thereof according to any one of claims 1 to 11.

23. A method for manufacturing a phthalocyanine compound or the salt thereof by acylating and carboxyethylating aminophthalocyanines.

24. A black metal phthalocyanine colorant which is obtained by acylating and carboxyethylating aminophthalocyanines.

25. The black metal phthalocyanine colorant according to claim 24, wherein said compound having the phthalocyanine structure is a phthalocyanine compound or the salt thereof having an acylamino group and a carboxyethylamino group as substituents on the phthalocyanine structure.

* * * * *